United States Patent
Ishii et al.

(10) Patent No.: US 6,369,141 B1
(45) Date of Patent: Apr. 9, 2002

(54) FLAME-RETARDANT POLYCARBONATE RESIN COMPOSITION

(75) Inventors: Kazuhiko Ishii; Ken Shimomai; Michio Nakata, all of Kanagawa (JP)

(73) Assignee: Mitsubishi Engineering-Plastics Corporation, Tokyo (JP)

( * ) Notice: Subject to any disclaimer, the term of this patent is extended or adjusted under 35 U.S.C. 154(b) by 0 days.

(21) Appl. No.: 09/440,641

(22) Filed: Nov. 16, 1999

(30) Foreign Application Priority Data

Dec. 3, 1998 (JP) ............................................. 10-343841

(51) Int. Cl.$^7$ ............................................. C08K 5/523
(52) U.S. Cl. ........................................ 524/127; 524/164
(58) Field of Search .................. 525/67, 148; 524/127, 524/145, 166, 163, 165

(56) References Cited

U.S. PATENT DOCUMENTS

| | | | | |
|---|---|---|---|---|
| 3,940,366 A | * | 2/1976 | Mark .......................... | 524/164 |
| 4,649,168 A | * | 3/1987 | Kress et al. ................. | 524/165 |
| 4,710,534 A | * | 12/1987 | Liu .............................. | 525/67 |
| 4,766,165 A | * | 8/1988 | Kress et al. ................. | 524/140 |
| 4,931,503 A | * | 6/1990 | Boutni et al. ................. | 525/67 |
| 4,988,748 A | * | 1/1991 | Fuhr et al. ................... | 524/141 |
| 5,068,285 A | * | 11/1991 | Laugitner .................... | 525/67 |
| 5,106,907 A | * | 4/1992 | Boutni ......................... | 525/67 |
| 5,258,432 A | * | 11/1993 | Ogoe et al. .................. | 524/141 |
| 5,276,077 A | * | 1/1994 | Schwane et al. ............. | 524/145 |
| 5,492,952 A | * | 2/1996 | Hirata et al. ................. | 524/139 |
| 5,532,302 A | * | 7/1996 | Nakanishi et al. | |
| 5,627,228 A | * | 5/1997 | Kobayashi ................... | 524/127 |
| 5,658,974 A | * | 8/1997 | Fuhr et al. ................... | 524/127 |
| 5,672,645 A | * | 9/1997 | Eckel et al. .................. | 524/127 |
| 5,674,924 A | * | 10/1997 | Lee et al. ..................... | 524/127 |
| 5,900,446 A | * | 5/1999 | Nishihara et al. | |
| 6,083,428 A | * | 7/2000 | Ueda et al. | |
| 6,127,465 A | * | 10/2000 | Nodera ........................ | 524/127 |
| 6,194,496 B1 | * | 2/2001 | Weber et al. | |
| 6,174,943 B1 | * | 6/2001 | Matsumoto et al. | |
| 6,319,432 B1 | * | 11/2001 | Harrod et al. | |

FOREIGN PATENT DOCUMENTS

| | | |
|---|---|---|
| JP | 53-18661 | 2/1978 |
| JP | 2-115262 | 4/1990 |
| JP | 7-53876 | 2/1995 |
| JP | 8-73654 | 3/1996 |
| JP | 9-249768 | 9/1997 |

* cited by examiner

*Primary Examiner*—Veronica P. Hoke
(74) *Attorney, Agent, or Firm*—Sughrue Mion, PLLC

(57) ABSTRACT

The present invention provides a flame-retardant polycarbonate resin composition which comprises (a) 100 parts by weight of an aromatic polycarbonate resin, (b) 0.5–40 parts by weight of a phosphorus-containing flame retardant, (c) 0.01–5 parts by weight of polyfluoroethylene, (d) 0–5 parts by weight of sulfonic acid metal salt, and (e) 0.5–30 parts by weight of a multi-layered polymer having a core made of an elastic polymer having a glass-transition temperature (Tg) lower than a room temperature, and an outer layer made of a thermoplastic resin having an adhesiveness or miscibility to polycarbonate, provided that the composition comprises 3–40 parts by weight of a phosphorus-containing flame retardant when said composition comprises substantially no sulfonic acid metal salt.

13 Claims, No Drawings

FLAME-RETARDANT POLYCARBONATE RESIN COMPOSITION

FIELD OF THE INVENTION

The present invention relates to a flame-retardant polycarbonate resin composition, more particularly to a flame-retardant polycarbonate resin composition which has an excellent weather-resistance.

BACKGROUND OF THE INVENTION

Polycarbonate resin compositions have excellent mechanical properties, so that they have been used as engineering plastics in various fields such as automobiles, office automation instruments, and electric/electronic products, in particular for products which require flammability, such as office automation instruments and home electric appliances. Conventionally, halogenated compounds have been mainly used for flame-retardant polycarbonate resins. Recently many resin compositions which contain halogen-free materials such as phosphorus-containing flame retardants (e.g., phosphate esters) have been reported in order to overcome problems such as environmental pollution. However, these resin compositions may have problems that the impact resistance and the heat stability are low.

Also reported are use of condensed phosphate esters having a structure which is derived from resorcinol in order to overcome a problem of mold deposit when molded.

Japanese Patent Laid-Open Publication No. 6-228426 and Japanese Patent Laid-Open Publication No. 7-53876 disclose resin compositions obtained by mixing condensed phosphate esters having a structure which is derived from Bisphenol A with thermoplastic resins such as polycarbonate resins, in which the bleeding property or hydrolysis resistance is improved. However, these conventional polycarbonate resin compositions have imbalanced combination of flammability, impact resistance and heat stability, and have no good weather-resistance and no good appearance after they stayed under a severe molding conditions or a molding machine.

SUMMARY OF THE INVENTION

The object of the present invention is to provide a flame-retardant polycarbonate resin composition which has an excellent mechanical properties, an excellent heat stability, an excellent flammability, as well as an excellent mold-depositing property, more preferably, which has an excellent weather-resistance and an excellent appearance when it stayed under a severe molding condition or in a molding machine.

The present inventors carried out zealous research in order to achieve the above-mentioned object, and found that an excellent flame-retardant polycarbonate resin composition having desired properties can be obtained by mixing a specific amount of each of a phosphorus-containing flame retardant, polyfluoroethylene and a multi-layered polymer with an aromatic polycarbonate resin. The present invention has been completed on the basis of these findings.

According to the present invention, there is provided a flame-retardant polycarbonate resin composition which comprises (a) 100 parts by weight of an aromatic polycarbonate resin, (b) 0.5–40 parts by weight of a phosphorus-containing flame retardant, (c) 0.01–5 parts by weight of polyfluoroethylene, (d) 0–5 parts by weight of sulfonic acid metal salt, and (e) 0.5–30 parts by weight of a multi-layered polymer having a core layer made of an elastic polymer having a glass-transition temperature (Tg) lower than a room temperature, and an outer layer made of a thermoplastic resin having an adhesiveness or miscibility to polycarbonate, provided that the composition comprises 3–40 parts by weight of a phosphorus-containing flame retardant when said composition comprises substantially no sulfonic acid metal salt.

Preferably, the composition according to the present invention comprises 3–40 parts by weight of a phosphorus-containing flame retardant (b), and comprises substantially no sulfonic acid metal salt (d).

Preferably, the composition according to the present invention further comprises (f) 2 parts by weight or less of a UV-light absorber.

Preferably, the composition according to the present invention further comprises (g) 0.1–20 parts by weight or less of a surface-treated titanium oxide.

Preferably, the aromatic polycarbonate resin (a) is derived from 2,2-bis(4-hydroxyphenyl)propane.

Preferably, the aromatic polycarbonate resin (a) has a viscosity-average molecular weight of 16,000–30,000.

Preferably, the phosphorus-containing flame retardant (b) is represented by formula I or II below:

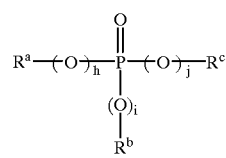

Formula I wherein Ra, Rb, and Rc are each independently a C1–C6 alkyl group or a C6–C20 aryl group optionally substituted with a C1–C6 alkyl group; h, i and j are each independently 0 or 1;

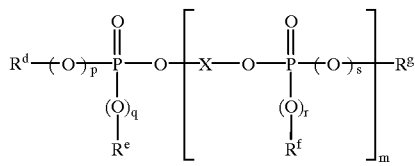

Formula II wherein Rd, Re, Rf, and Rg are each independently a C1–C6 alkyl group or a C6–C20 aryl group optionally substituted with a C1–C6 alkyl group; p, q, r and s are each independently 0 or 1; m is an integer of 1–5; and X is an arylene group.

Preferably, the phosphorus-containing flame retardant (b) is represented by formula III below:

Formula III

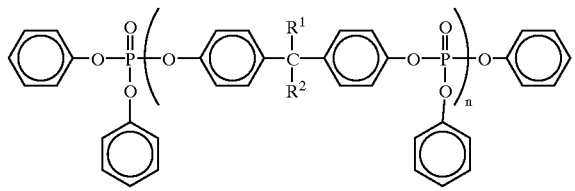

wherein $R^1$ and $R^2$ are each independently methyl group, hydrogen atom or phenyl group; n is an integer from 1 to 5.

Preferably, polyfluoroethylene (c) has a fibril-forming ability.

Preferably, the multi-layered polymer (e) contains alkyl (meth)acrylate polymer.

Preferably, the multi-layered polymer (e) has an outer layer consisting of alkyl (meth)acrylate polymer.

Preferably, the multi-layered polymer (e) has a core layer made of an elastic polymer consisting of alkyl(meth)acrylate polymer.

Preferably, the multi-layered polymer (e) has a core layer made of an elastic polymer consisting of crosslinked alkyl (meth)acrylate polymer having a glass-transition temperature of 0° C. or lower, and an outer layer made of alkyl (meth)acrylate polymer.

Preferably, the multi-layered polymer (e) has a core layer made of a diene-containing polymer.

Preferably, the multi-layered polymer (e) has a core layer made of a polybutadiene or a butadiene/styrene copolymer.

Preferably, the multi-layered polymer (e) has a core layer made of a crosslinked butadiene-containing copolymer.

According to another aspect of the present invention, there is provided a molded product made of a flame-retardant polycarbonate resin composition which comprises (a) 100 parts by weight of an aromatic polycarbonate resin, (b) 0.5–40 parts by weight of a phosphorus-containing flame retardant, (c) 0.01–5 parts by weight of polyfluoroethylene, (d) 0–5 parts by weight of sulfonic acid metal salt, and (e) 0.5–30 parts by weight of a multi-layered polymer having a core layer made of an elastic polymer having a glass-transition temperature (Tg) lower than a room temperature, and an outer layer made of a thermoplastic resin having an adhesiveness or miscibility to polycarbonate, provided that the composition comprises 3–40 parts by weight of a phosphorus-containing flame retardant when said composition comprises substantially no sulfonic acid metal salt.

DETAILED DESCRIPTION OF THE PREFERRED EMBODIMENTS

The present invention will be described in detail below. The values on both ends of symbol "–" in this specification mean a range from a lower limit to an upper limit, wherein the range includes both values.

The flame-retardant polycarbonate resin composition according to the present invention comprises (a)100 parts by weight of an aromatic polycarbonate resin, (b)0.5–40 parts by weight of a phosphorus-containing flame retardant, (c)0.01–5 parts by weight of polyfluoroethylene, (d)0–5 parts by weight of sulfonic acid metal salt, and (e)0.5–30 parts by weight of a multi-layered polymer having a core layer made of an elastic polymer having a glass-transition temperature (Tg) lower than a room temperature, and an outer layer made of a thermoplastic resin having an adhesiveness or miscibility to polycarbonate, provided that said composition comprises (d)0.01–5 parts by weight of sulfonic acid metal salt when said composition comprises (b) 0.5–3 parts by weight of a phosphorus-containing flame retardant.

The aromatic polycarbonate resin used for the present invention includes a homopolymer or copolymer of an optionally blanched thermoplastic aromatic polycarbonate which is prepared by reacting an aromatic hydroxyl compound or a mixture of an aromatic hydroxyl compound and a small amount of polyhydroxyl compound with phosgene or a carbonate diester. The aromatic polycarbonate resin can be prepared, for example, by the phosgene method (the interfacial polycondensation) or the fusion cook method (the ester exchange method). An aromatic polycarbonate resin which is prepared by the fusion cook method and whose number of terminal OH groups is controlled, can also be used.

For the aromatic hydroxyl compound used for the present invention are used 2,2-bis(4-hydroxyphenyl)propane (=Bisphenol A), Tetramethyl Bisphenol A, bis(4-hydroxyphenyl)-p-diisopropylbenzene, hydroquinone, resorcinol, and 4,4-dihydroxydiphenyl, preferably Bisphenol A.

A branched aromatic polycarbonate resin can be obtained by using a polyhydroxyl compound such as phloroglucinol, 4,6-dimethyl-2,4,6-tri(4-hydroxyphenyl)-2-heptene, 4,6-dimethyl-2,4,6-tri(4-hydroxyphenyl)heptane, 2,6-dimethyl-2,4,6-tri(4-hydroxyphenyl)-3-heptene, 1,3,5-tri(4-hydroxyphenyl)benzene, and 1,1,1-tri(4-hydroxyphenyl) ethane, or 3,3-bis(4-hydroxyaryl)oxyindole (=isatinbisphenol A), 5-chloroisatinbisphenol, 5,7-dichloroisatinbisphenol, or 5-bromoisatinbisphenol A together with the above-mentioned aromatic hydroxyl compound at 0.01–10 mol. %, preferably at 0.1–2 mol. %, per whole mixture containing the aromatic hydroxyl compound.

A molecular weight of the resin used for the present invention is regulated by using a monovalent aromatic hydroxyl compound such as m- or p-methylphenol, m- or p-propylphenol, p-tert-butylphenol, and a p-long chain alkyl-substituted phenol.

For the aromatic polycarbonate resin for the present invention are used preferably a polycarbonate resin derived from 2,2-bis(4-hydroxyphenyl)propane, and a polycarbonate copolymer derived from 2,2-bis(4-hydroxyphenyl)propane and other aromatic dihydroxyl compound(s).

The aromatic polycarbonate resin used for the present invention can be a mixture of two or more resins.

The aromatic polycarbonate resin used for the present invention has a viscosity-average molecular weight, preferably, from 16,000 to 30,000, more preferably, from 18,000 to 26,000, as calculated from a viscosity values of solutions determined at 25° C. using methylene chloride as a solvent.

For a phosphorus-containing flame retardant used for the present invention are used preferably a halogen-free phosphorus-containing compound represented by formula I or formula II below.

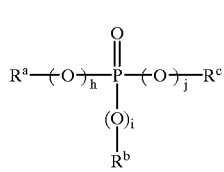

Formula I wherein Ra, Rb, and Rc are each independently a C1–C6 alkyl group or a C6–C20 aryl group optionally substituted with a C1–C6 alkyl group; h, i and j are each independently 0 or 1:

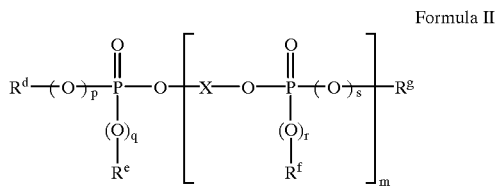

Formula II wherein Rd, Re, Rf, and Rg are each independently a C1–C6 alkyl group or a C6–C20 aryl group optionally substituted with a C1–C6 alkyl group; p, q, r and s are each independently 0 or 1; m is an integer from 1 to 5; X is an arylene group:

The halogen-free phosphorus-containing compounds represented by formula I include triphenyl phosphate, tricresyl phosphate, diphenyl-2-ethylcresyl phosphate, tri(isopropylphenyl)phosphate, diphenyl methylphosphonate, diethyl phenylphosphonate, diphenylcresyl phosphate, tributyl phosphate and the like. The halogen-free phosphorus-containing compounds represented by formula I can be produced from phosphorus oxychloride and the like according to well known methods.

The halogen-free phosphorus-containing compounds represented by formula II include a condensed phosphate ester having a value of m from 1 to 5. The condensed phosphate ester can be a single condensed phosphate ester having a single value of m, or can be a mixture of several condensed phosphate esters having several values of m with an average value of m from 1 to 5. X is an arylene group which is derived from dihydroxyl compounds such as resorcinol, hydroquinone and Bisphenol A. X is preferably a group derived from Bisphenol A.

In case that the dihydroxyl compound is resorcinol, the phosphorus-containing compounds represented by formula II include phenylresorcinol polyphosphate, cresyl resorcinol polyphosphate, phenyl cresyl resorcinol polyphosphate, xylyl resorcinol polyphosphate, phenyl-p-tert-butylphenyl resorcinol polyphosphate, cresyl xylyl resorcinol polyphosphate, phenyl isopropyl diisopropylphenyl resorcinol polyphosphate, and the like.

In case that the dihydroxyl compound is Bisphenol A, it is preferable to use a phosphorus-containing flame retardant represented by formula III below. A condensed phosphate ester represented by formula III contains phosphorus atoms in the molecule, does not contain a structure derived from resorcinol, and does not have any substituent on the benzene ring.

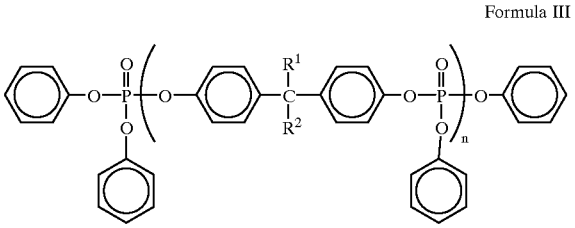

Formula III wherein $R^1$ and $R^2$ are each independently methyl group, hydrogen atom, or phenyl group, preferably methyl group or hydrogen atom, most preferably methyl group; n is an integer from 1 to 5, preferably an integer from 1 to 3. In case that the phosphorus-containing flame retardant represented by formula III is a mixture of several condensed phosphate esters having several values of n, an average value of n is from 1 to 5.

The aromatic polycarbonate resin compositions containing a phosphorus-containing flame retardant represented by formula III are advantageous over those containing other phosphorus-containing flame retardants especially with respect to weather-resistance as well as impact strength, flammability, heat resistance, non-corrosive property against a metal mold and a screw in molding, moldability (e.g., no mold deposit), and the composition has a good balance of these properties.

In the present invention, the content of a phosphorus-containing flame retardant is 0.5–40 parts by weight per 100 parts by weight of an aromatic polycarbonate resin. If the content of a phosphorus-containing flame retardant is less than 0.5 parts by weight, flammability tends to be lowered. If the content of a phosphorus-containing flame retardant is more than 40 parts by weight, mechanical properties tend to be lowered. The content of a phosphorus-containing flame retardant is preferably 0.8–30 parts by weight, more preferably 1–25 parts by weight, per 100 parts by weight of an aromatic polycarbonate resin. In case that the flame-retardant polycarbonate resin composition according to the present invention contains substantially no sulfonic acid metal salt, the composition contains 3–40 parts by weight, preferably 5–30 parts by weight, more preferably 6–25 parts by weight of a phosphorus-containing flame retardant per 100 parts by weight of an aromatic polycarbonate resin to secure enough flammability.

The polyfluoroethylene used for the present invention includes polytetrafluoroethylene having a fibril-forming ability. "A fibril-forming ability" is a tendency to be easily dispersed in a polymer and to bind polymer molecules one another to form a fibroid material. Polytetrafluoroethylene having a fibril-forming ability is classified as type 3 in the ASTM. The polytetrafluoroethylene having a fibril-forming ability includes commercially available "Teflon 6J", "Teflon 30J" (both Mitsui-DuPont Fluorochemical Co., Ltd.), and "Polyflon" (Daikin Chem. Ind. Co., Ltd.). ("Teflon" and "Polyflon" are trade names respectively.)

In the present invention, the content of a polyfluoroethylene is 0.01–5 parts by weight per 100 parts by weight of an aromatic polycarbonate resin. If the content of the polyfluoroethylene is less than 0.01 parts by weight per 100 parts by weight of an aromatic polycarbonate resin, the obtained composition tends to have an insufficient flammability. If the content of the polyolefin is more than 5 parts by weight per 100 parts by weight of an aromatic polycarbonate resin, the molded product tends to have poor appearance. The content of a polyfluoroethylene per 100 parts by weight of an aromatic polymer resin is preferably 0.02–4 parts by weight, more preferably 0.03–3 parts by weight.

In the present invention, 0–5 parts by weight of sulfonic acid metal salt is mixed with 100 parts by weight of an aromatic polycarbonate resin. The sulfonic acid metal salt used for the present invention includes an aliphatic organic sulfonic acid metal salt and an aromatic organic sulfonic acid metal salt. The metal of the organic sulfonic acid metal salt is preferably an alkali metal, an alkali earth metal, and the like. The alkali metal and the alkali earth metal include sodium, lithium, potassium, rubidium, cesium, beryllium, magnesium, calcium, strontium, barium, and the like. The sulfonic acid metal salt can be used as a mixture of two or more salts. For the sulfonic acid metal salt for the present invention, it is preferred from the viewpoint of flammability and heat stability to use an aromatic sulfone sulfonic acid metal salt, a perfluoroalkane sulfonic acid metal salt, and the like.

For the aromatic sulfone sulfonic acid metal salt are preferably used an aromatic sulfone sulfonic acid alkali metal salt, an aromatic sulfone sulfonic acid alkali earth metal salt, and the like. The aromatic sulfone sulfonic acid alkali metal salt and the aromatic sulfone sulfonic acid alkali earth metal salt can be polymers.

The aromatic sulfone sulfonic acid metal salt includes sodium diphenylsulfone-3-sulfonate, potassium diphenylsulfone-3-sulfonate, sodium 4,4'-dibromodiphenylsulfone-3-sulfonate, potassium 4,4'-dibromodiphenylsulfone-3-sulfonate, calcium 4-chloro-4'-nitrodiphenylsulfone-3-sulfonate, dipotassium diphenylsulfone-3,3'-disulfonate, and the like.

The perfluoroalkanesulfonic acid metal salt includes sodium perfluorobutanesulfonate, sodium perfluoromethylbutanesulfonate, potassium perfluoromethylbutanesulfonate, sodium perfluorooctanesulfonate, potassium perfluorooctanesulfonate, tetramethylammonium perfluorobutanesulfonate, and the like.

The content of a sulfonic acid metal salt is less than 5 parts by weight per 100 parts by weight of an aromatic polycarbonate resin. If the content of a sulfonic acid metal salt is more than 5 parts by weight per 100 parts by weight of an aromatic polycarbonate resin, the obtained composition tends to have low heat stability. The content of a sulfonic acid metal salt is preferably 4 parts by weight or less, more preferably 3 parts by weight or less, per 100 parts by weight of an aromatic polycarbonate resin .

In case that 3–40 parts by weight of a phosphorus-containing flame retardant is used in the present invention, it is not necessary to use any sulfonic acid metal salt.

As described hereinafter, in case that a multi-layered polymer whose core layer is made of a diene-containing polymer is used as the multi-layered polymer of component (e), it is preferable not to use any sulfonic acid metal salt. Especially in case that a thin molded product is produced, or the composition is molded at a high temperature or in a large type of molding machine or at a long retention time in a molding machine, no sulfonic acid metal salt is preferably used in order to obtain a good appearance of the molded product. In case that substantially no sulfonic acid metal salt is used, it is necessary to control the amount of a phosphorus-containing flame retardant in order to give enough flammability, i.e., to use 3–40 parts by weight of a phosphorus-containing flame retardant.

In the present invention, 0.5–30 parts by weight of a multi-layered polymer having a core layer made of an elastic polymer having a glass-transition temperature (Tg) lower than room temperature, and an outer layer made of a thermoplastic resin having an adhesiveness or miscibility to a polycarbonate, is mixed with 100 parts by weight of an aromatic polycarbonate resin. The multi-layered polymer functions as an impact resistance-improving agent. The glass-transition temperature (Tg) of the elastic polymer which constitutes the core layer is preferably 0° C. or lower. The phrase "an adhesiveness or miscibility to the polycarbonate" means compatibility of the composition with a matrix resin, i.e., the aromatic polycarbonate resin.

The multi-layered polymer has one or more coating layers on the surface of a core layer, the polymer being prepared, for example, by serially coating the surface of a core polymer with other polymers by a continuous multi-step seed emulsion polymerization method in which a polymer in a former step is coated with another polymer in a later step, i.e., the multi-layered structure has a structure consisting of at least two layers: a core layer and an outer layer. The multi-layered polymer includes a multi-layered polymer which contains an alkyl (meth)acrylate polymer and the like. The alkyl (meth)acrylate polymer can be used in the core layer and/or the outer layer. The core layer is made of an elastic polymer having a low glass-transition temperature. For the present invention can be used any multi-layered polymer so long as the multi-layered polymer has above-mentioned properties. For the polymer is used a polymer of (C1–C8 alkyl)acrylates, preferably (C2–C8 alkyl)acrylates, more preferably a polymer of butyl acrylate or 2-ethylhexyl acrylate. One of other vinyl monomers which is polymerizable with these alkyl acrylate polymers can also be used in combination. The other vinyl monomer is used usually at 50% by weight or lower, preferably 30% by weight or lower, based on whole monomers used for a polymer which forms a core layer. These copolymerizable monomers include aromatic vinyl compounds and aromatic vinylidene compounds (e.g., styrene, vinyltoluene, and α-methylstyrene), vinyl cyanides and vinylidene cyanides (e.g., acrylonitrile and methacrylonitrile), alkyl methacrylates (e.g., methyl methacrylate and butyl methacrylate), and the like. For the core layer can be used crosslinking agents such as an ethylenic unsaturated monomer. The crosslinking agents include alkylene diol di(meth)acrylate, polyester di(meth)acrylate, divinylbenzene, trivinylbenzene, triallyl cyanurate, allyl (meth)acrylate, and the like. Divinylbenzene, butyleneglycol diacrylate and hexanediol diacrylate are preferred, and divinylbenzene is particularly preferred. The content of a crosslinking monomer is usually 0.01–5% by weight, preferably 0.1–2% by weight, per whole amount of monomers for the core layer. The polymer can be grafted with allyl methacrylate and the like.

The alkyl (meth)acrylate polymer which forms an outer layer, includes a polymer from one or more monomers selected from a group consisting of ethyl acrylate, butyl acrylate, ethylhexyl acrylate, methyl methacrylate, butyl methacrylate, and the like. The polymer may be a copolymer from one or more monomers (A) selected from a group consisting of ethyl acrylate, butyl acrylate, ethylhexyl acrylate, methyl methacrylate, butyl methacrylate, and the like, and a monomer (B) which is copolymerizable with monomer (A), so long as functions of the outer layer are not spoiled. The monomer (B) includes vinyl cyanides and vinylidene cyanides (e.g., acrylonitrile and methacrylonitrile), and styrene derivatives (e.g., styrene, vinyl toluene, α-methylstyrene, monochlorostyrene, 3,4-dichlorostyrene, and bromostyrene). For the alkyl(meth) acrylate polymer can be used crosslinking agents such as an ethylenic unsaturated monomer. The crosslinking agents include alkylenediol di(meth)acrylate, polyester di(meth)acrylate, divinylbenzene, trivinylbenzene, triallyl cyanurate, and allyl (meth)acrylate. The amount of the crosslinking agent is usually 30% by weight or less per the whole amount of the monomer forming the outer layer, preferably 0.5–20% by weight, more preferably 5–15% by weight.

For the core layer is used an alkyl (meth)acrylate polymer as well as optionally crosslinked diene-containing polymers such as polybutadiene and a butadiene/styrene copolymer as a saturated or unsaturated elastic component.

A weight ratio of core layer:outer layer of a multi-layered polymer is usually 50:50–90:10. There is no limitation in the ratio so long as an outer layer can cover a core layer completely.

A multi-layered polymer having a structure consisting of an inner layer in the center of the core layer, and one having an intermediate layer between the core layer and the outer layer, can also be used.

A multi-layered polymer having a structure in which composition changes gradually from the core layer to the surface can also be used.

The content of a multi-layered polymer in the composition of this invention is 0.5–30 parts by weight per 100 parts by weight of an aromatic polycarbonate resin. If the content of a multi-layered polymer is less than 0.5 parts by weight, impact resistance tends to be lowered. If the content of a multi-layered polymer is more than 30 parts by weight, appearance of a molded product tends to be lowered. The content of a multi-layered polymer is preferably 1–25 parts by weight, more preferably 2–20 parts by weight.

The flame-retardant polycarbonate resin composition according to the present invention may contain a UV-light absorbent if desired.

The UV-light absorbent used for the present invention includes benzophenones, benzotriazoles, phenyl salicylates, hindered amines, and the like. The benzophenone UV-light absorbent includes 2,4-dihydroxybenzophenone, 2-hydroxy-4-methoxybenzophenone, 2-hydroxy-4-n-octoxybenzophenone, 2-hydroxy-4-dodecyloxybenzophenone, 2-hydroxy-4-octadecyloxybenzophenone, 2,2'-dihydroxy-4-methoxybenzophenone, 2,2'-dihydroxy-4,4'-dimethoxybenzophenone, 2,2',4,4'-tetrahydroxybenzophenone, and the like.

The benzotriazole UV-light absorbent includes 2-(2'-hydroxy-5-methylphenyl)benzotriazole, 2-(2'-hydroxy-3',5'-di-tert-butylphenyl)benzotriazole, 2-(2'-hydroxy-3'-tert-butyl-5'-methylphenyl)benzotriazole, and the like.

The phenyl salicylate UV-light absorbent includes phenyl salicylate, 2,4-di-tert-butylphenyl-3,5-di-tert-butyl-4-hydroxybenzoate, and the like. The hindered amine UV-light absorbent includes bis(2,2,6,6-tetramethyl-4-piperidinyl) sebacate and the like.

The UV-light absorbent also includes a compound which has functions of converting energy of UV light into vibration energy in the molecule, and emitting the vibration energy as heat energy and other energy. A UV-light absorbent which expresses an effect when used together with an antioxidant or a coloring agent, a quencher which is a photostabilizer which works as a photoenergy-converting agent, and other agents, can also be used.

The content of a UV-light absorbent is 2 parts by weight or less, for example, 0.01–2 parts by weight per 100 parts by weight of an aromatic carbonate resin. If the content is less than 0.01 parts by weight, weather-resistance tends to become insufficient. If the content is more than 2 parts by weight, the composition tends to give a strong yellow color, have an inferior color-tuning property, and easily cause the bleeding-out. In case that an UV-light absorbent is used for the present invention, the content is preferably 0.05–1.8 parts by weight, more preferably 0.1–1.5 parts by weight, per 100 parts by weight of an aromatic polycarbonate resin.

The flame-retardant polycarbonate resin composition according to the present invention can also contain titanium oxide as an optional component. The properties such as brightness, shading property and ray reflection coefficient of a molded product, can be enhanced by mixing titanium oxide. Titanium oxide produced by both the sulfuric acid method and the chlorine method can be used in the present invention. Titanium oxide produced by the sulfuric acid method has lower brightness than that produced by the chlorine method. Therefore, it is preferable to use titanium oxide produced by the chlorine method. Titanium oxide has rutile-type and anatase-type crystalline forms. The former crystalline form is more excellent with respect to brightness, ray reflection coefficient and photoresistance than the latter. It is preferable to use the rutile-type.

In case that the surface of titanium oxide is not treated, the molecular weight of the polycarbonate resin tends to be lowered, and the color of the polycarbonate resin tends to be changed when the resin composition is fused and kneaded at a high temperature. Therefore, it is preferable to use surface-treated titanium oxide. The surface of titanium oxide is treated with one or more inorganic surface-treating agents which are selected from a group consisting of alumina hydrate and silicate hydrate, or preferably with an organic surface-treating agent such as silicone compounds. The silicone compounds include polyorganosiloxane (Japanese Patent Publication (KOKOKU) No.63-26140), polyhydrocarbon siloxane (Japanese Patent Publication (KOKOKU) No.63-31513), silane coupling agent (Japanese Patent Publication (KOKOKU) No.3-2189) and the like.

An average particle size of titanium oxide is preferably 0.05–0.5 $\mu$m. If the average particle size is smaller than 0.05 $\mu$m, the obtained molded product tends to have insufficient shading property and/or an insufficient ray-reflecting coefficient. If the average particle size is larger than 0.5 $\mu$m, the obtained molded product tends to have insufficient shading property and/or an insufficient ray-reflecting coefficient, as well as an inferior appearance and/or a low impact strength. The average particle size is more preferably 0.08–0.45 $\mu$m, most preferably 0.1–0.4 $\mu$m.

In case that titanium oxide is used for the flame-retardant polycarbonate resin composition according to the present invention, the content is 30 parts by weight or less, for example, 0.1–30 parts by weight, per 100 parts by weight of a polycarbonate resin. Although a shading property of a molded product is enhanced by mixing titanium oxide, if the amount is more than 30 parts by weight, the obtained resin composition tends to have low impact strength. The amount of titanium oxide is more preferably 1–25 parts by weight per 100 parts by weight of a polycarbonate resin.

There is no limitation with respect to the method for producing the flame-retardant polycarbonate resin composition according to the present invention. For example, there can be used a method in which an aromatic polycarbonate resin, a phosphorus-containing flame retardant, polyfluoroethylene, a multi-layered polymer, and, if necessary, a sulfonic acid metal salt and a UV-light absorbent, are fused and kneaded all together, and a method in which an aromatic polycarbonate resin, a phosphorus-containing flame retardant, and polytetrafluoroethylene are kneaded, then a multi-layered polymer and a UV-light absorbent are mixed, and the mixture are fused and kneaded.

The flame-retardant polycarbonate resin composition according to the present invention can contain, if necessary, stabilizers (e.g., antioxidant), additives (e.g., pigment, dye, lubricant, other flame retardant, mold release agent, and mold releasing agent), fibroid reinforcing agents (e.g., glass fiber and carbon fiber), plate reinforcing agents (e.g., mica, talc, and glass flake), and whiskers (e.g., potassium titanate and aluminum borate).

The flame-retardant polycarbonate resin composition according to the present invention can also contain thermoplastic resins such as styrene resin, polyester resin such as poly(butylene terephthalate) and poly(ethylene terephthalate), polyamide resin, and polyolefin resin so long as the properties are not spoiled. The content of the thermoplastic resin is preferably 40% by weight or less, more preferably 30% by weight or less, of the flame-retardant polycarbonate resin composition.

The flame-retardant polycarbonate resin composition according to the present invention contains a halogen-free phosphorus-containing flame retardant which is free of chlorine and bromine, and therefore is a favorable material not to cause corrosion of a molding machine and a metal mold.

The flame-retardant polycarbonate resin composition according to the present invention can be molded by various molding methods such as the injection molding and the extrusion molding. Heat stability of the resin composition according to the present invention during molding is remarkably improved, compared with conventional compositions which contain bromine-containing flame retardant and those which contain phosphate ester flame retardant, so that defective appearance (e.g., "silver" streak and pearl luster) and/or deterioration in physical properties are suppressed even under severer molding conditions under which thinner products are produced. Therefore, the flame-retardant polycarbonate resin composition according to the present invention is suitably used, for example, for parts for the electronic information-processing equipment which is required to be light and small recently, such as a battery case, for example, for a portable telephone and a personal computer.

A molded product made of the flame-retardant polycarbonate resin composition according to the present invention, has flamability which satisfies the severe level V-0 even at a thickness of 0.8 mm or a thickness of 1.6 mm. The composition has an excellent heat resistance, and an excellent impact resistance, an excellent weather-resistance, and an excellent mold-depositing property, and is useful, for example, for a thin molded product having parts whose thickness is 1 mm or thinner. An Izod impact strength of a molded product made of the flame-retardant polycarbonate resin composition according to the present invention, is preferably 300 j/m or larger, more preferably 400 j/m or larger. A deflection temperature under load of a molded product made of the flame-retardant polycarbonate resin composition according to the present invention, is preferably 80° C. or higher, more preferably 90° C. or higher.

The present invention is described more concretely by the following examples merely to illustrate the present invention. It will be apparent to those skilled in the art that modifications, variations, and improvements are possible without departing from the spirit of the present invention. The scope of the present invention is not limited by the following examples.

EXAMPLES

The following materials were used in Examples and Comparative Examples:
(1) Polycarbonate resin: poly-4,4-isopropylidenediphenylcarbonate, commercial name "Iupilon" (registered trade mark) S-3000, viscosity-average molecular weight 21,000, a product of Mitsubishi Engineering-Plastics Corp., Ltd. (sometimes abbreviated as "PC resin" hereinafter).
(2) Phosphorus-containing flame retardant #1: condensed phosphate ester represented by formula IV below (n=1.1), product code "CR-741", a product of Daihachi Chem. Co., Ltd.

Formula IV

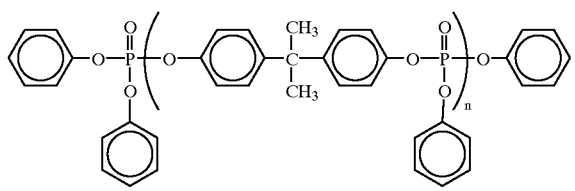

(3) Phosphorus-containing flame retardant #2: phosphate ester TPP, a product of Daihachi Chem. Co., Ltd.
(4) Phosphorus-containing flame retardant #3: condensed phosphate ester represented by formula V below (n=1.3), product code "CR-733", a product of Daihachi Chem. Co., Ltd.

Formula V

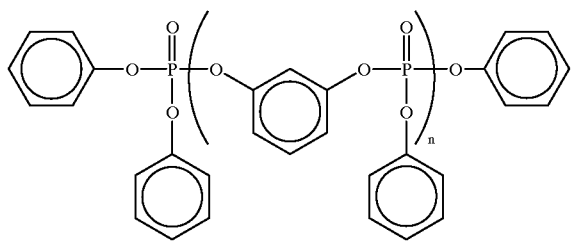

(5) Phosphorus-containing flame retardant #4: condensed phosphate ester represented by formula VI below (n=1.01), product code "FP-500", a product of Asahi Denka Kogyo Co., Ltd.

Formula VI

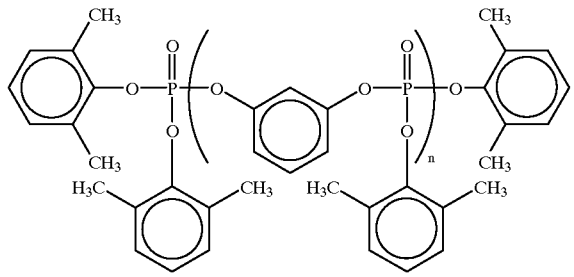

(6) Phosphorus-containing flame retardant #5: condensed phosphate ester represented by formula VII below (n=1.1), product code "CR-747", a product of Daihachi Chem. Co., Ltd.

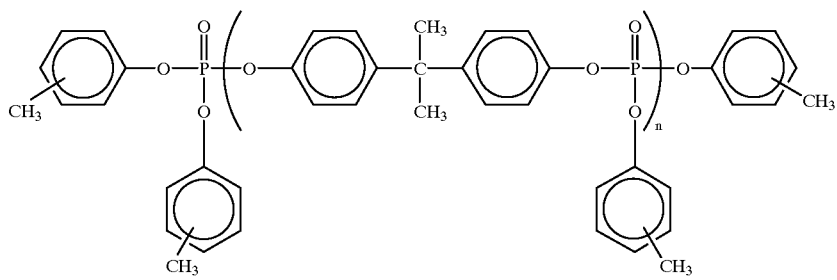

Formula VII (7) Polytetrafluoroethylene (abbreviated as "PTFE" hereafter): commercial name "Polyfuron F-201L", a product of Daikin Industries Co., Ltd.
(8) Multi-layered polymer #1: a multi-layered polymer consisting of poly(alkyl acrylate) core and poly(methyl acrylate) shell; product code "EXL2315", a product of Kureha Chemical Industry Co., Ltd.
(9) Multi-layered polymer #2: a multi-layered polymer consisting of polybutadiene core and poly(methyl acrylate) shell; product code "EXL2603", a product of Kureha Chemical Industry Co., Ltd.
(10) Multi-layered polymer #3: a multi-layered polymer consisting of polystylene-butadiene copolymer core and poly(methyl (meth)acrylate) shell; product code "E-901", a product of JSR Corp., Ltd.
(11) Multi-layered polymer #4: a multi-layered polymer consisting of poly(alkyl acrylate) core and poly(methyl methacrylate) shell; product code "EXL2313", a product of Kureha Chemical Industry Co., Ltd.
(12) Multi-layered polymer #5: a multi-layered polymer consisting of siloxane-containing poly(alkyl acrylate) core and polystyrene-acrylonitrile copolymer shell; product code "RK-200", a product of Mitsubishi Rayon Co., Ltd.
(13) Multi-layered polymer #6: a multi-layered polymer consisting of styrene polymer core, poly(alkyl acrylate) intermediate layer, and polystyrene-acrylonitrile copolymer shell; product code "MG-1011", a product of Takeda Chemical Ind. Co., Ltd.
(14) UV-light absorbent: 2-(2'-hydroxy-5'-tert-octylphenyl) benzotriazole.
(15) Titanium oxide: surface-treated titanium oxide, PC-3 (Ishihara Sangyo Co., Ltd.) an average particle size of 0.28 μm, which was produced by the chlorine method, followed by the first surface treatment with inorganic surface-treating agents consisting of alumina hydrate and silicate hydrate, and the second surface treatment with an organic surface-treating agent consisting of organohydrogensiloxane.
(16) Sulfonic acid metal salt #1: potassium diphenylsulfone sulfonate, product code "KSS", a product of UCB Japan, Ltd.
(17) Sulfonic acid metal salt #2: potassium perfluoroalkanesulfonate, $C_4F_9SO_3K$, commercial name "Megafac F114", a product of Dainippon Ink And Chemicals, Incorporated Industry, Ltd.
(18) ABS resin: block polymerized ABS, product code "AT-05", a product of Mitsui Chemicals Co., Ltd.

Evaluation of physical properties of specimens were carried out according to the following methods:
(A-1) Flammability #1: Vertical burning test was carried out using specimens having a thickness of 0.8 mm (UL standard), followed by the evaluation according to the UL standard (UL-94).
(A-2) Flammability #2: Vertical burning test was carried out using specimens having a thickness of 1.6 mm (UL standard), followed by the evaluation according to the UL standard (UL-94).
(B) Hue (YI) and reflection coefficient: A plate of 90 mm×50 mm×3 mm is molded, whose hue is analyzed using a multi-light source spectrophotometer (MSC-5N, Suga Testing Machine), followed by determining a reflection coefficient at 550 nm using a spectrophotometer (U-3400, Hitachi Co., Ltd.).
(C) Mold-depositing property: Continuous molding of specimens for burning test is carried out 500 times under the molding condition described in each example, followed by evaluation of attached material on the metal mold as follows: ○, little is attached to the metal mold; ×, much is attached to the metal mold.
(D) Impact strength: 3.2-mm specimens for Izod impact test were molded, and 0.25R notches were cut for evaluation.

Example 1

100 parts by weight of PC resin, 11.8 parts by weight of phosphorus-containing flame retardant #1, 5.9 parts by weight of multi-layered polymer #1, 0.35 parts by weight of PTFE, and 0.35 parts by weight of a UV-light absorbent were mixed at a tumbler for 20 min. The resultant mixture was pelletized using a 30 mm twine screw extruder at a cylinder temperature of 270° C. The obtained pellets were molded to specimens having a thickness of 0.8 mm for burning test using an injection molding machine at a cylinder temperature of 280° C., to evaluate flammability according to the UL standard for testing. In addition, continuous molding was carried out 500 times at a cylinder temperature of 280° C. and any attached material on the metal mold was visually observed. In addition, a plate was molded at 280° C. to carry out a weather-resistance test in a sunshine fader for 200 hours to evaluate hue before and after the test. Specimens used for Izod test and those for evaluation of a deflection temperature under load were also molded at 280° C. The results are summarized in Table 1.

Example 2

Pelletization was carried out in a similar manner to Example 1 except that phosphorus-containing flame retardant #1 was substituted with phosphorus-containing flame retardant #3. Molding and evaluation were performed similarly. The results are summarized in Table 1.

Example 3

Pelletization was carried out in a similar manner to Example 1 except that phosphorus-containing flame retardant #1 was substituted with phosphorus-containing flame retardant #4. Molding and evaluation were performed similarly. The results are summarized in Table 1.

Example 4

Pelletization was carried out in a similar manner to Example 1 except that phosphorus-containing flame retardant #1 was substituted with phosphorus-containing flame retardant #5. Molding and evaluation were performed similarly. The results are summarized in Table 1.

Example 5

Pelletization was carried out in a similar manner to Example 1 except that 16.2 parts by weight of titanium oxide was mixed with the composition of Example 1. Molding and evaluation were performed similarly. Reflection coefficients of plate before and after weather-resistance test were also determined. The results are summarized in Table 2.

Example 6

Pelletization was carried out in a similar manner to Example 5 except that multi-layered polymer #1 was substituted with multi-layered polymer #2. Molding and evaluation were performed similarly. The results are summarized in Table 2.

Example 7

Pelletization was carried out in a similar manner to Example 5 except that phosphorus-containing flame-retardant #1 was substituted with phosphorus-containing flame-retardant #2. Molding and evaluation were performed similarly. The results are summarized in Table 2.

Example 8

Pelletization was carried out in a similar manner to Example 5 except that phosphorus-containing flame-retardant #1 was substituted with phosphorus-containing flame-retardant #3. Molding and evaluation were performed similarly. The results are summarized in Table 2.

Example 9

Pelletization was carried out in a similar manner to Example 5 except that phosphorus-containing flame-retardant #1 was substituted with phosphorus-containing flame-retardant #4. Molding and evaluation were performed similarly. The results are summarized in Table 2.

Example 10

Pelletization was carried out in a similar manner to Example 5 except that phosphorus-containing flame-retardant #1 was substituted with phosphorus-containing flame-retardant #5. Molding and evaluation were performed similarly. The results are summarized in Table 2.

Example 11

100 parts by weight of PC resin, 2.1 parts by weight of phosphorus-containing flame retardant #4, 3.2 parts by weight of multi-layered polymer #3, 0.21 parts by weight of PTFE, and 0.11 parts by weight of a sulfonic acid metal salt #1 were mixed at a tumbler for 20 min. The resultant mixture was pelletized using a 30 mm twine screw extruder at a cylinder temperature of 270° C. The obtained pellets were molded to specimens having a thickness of 1.6 mm for burning test using an injection molding machine, to evaluate flammability according to the UL method for testing. In addition, specimen for the Izod impact test were molded at a cylinder temperature of 270° C., followed by cutting a notch having 0.25R using a notching machine to evaluate with an Izod impact-testing machine. The results are summarized in Table 3.

Example 12

Pelletization was carried out in a similar manner to Example 11 except that the amounts of phosphorus-containing flame retardant #4, PTFE, and multi-layered polymer #3 were changed into 6.8 parts by weight, 0.23 parts by weight, and 5.6 parts by weight respectively. Molding and evaluation were performed similarly. The results are summarized in Table 3.

Example 13

Pelletization was carried out in a similar manner to Example 11 except that the amounts of phosphorus-containing flame retardant #4, PTFE, sulfonic acid metal salt, and multi-layered polymer #3 were changed into 18.8 parts by weight, 0.25 parts by weight, 0.12 parts by weight, and 6.3 parts by weight respectively. Molding and evaluation were performed similarly. The results are summarized in Table 3.

Example 14

Pelletization was carried out in a similar manner to Example 11 except that multi-layered polymer #3 was substituted with multi-layered polymer #4. Molding and evaluation were performed similarly. The results are summarized in Table 3.

Example 15

Pelletization was carried out in a similar manner to Example 11 except that phosphorus-containing flame-retardant #4 was substituted with phosphorus-containing flame-retardant #3. Molding and evaluation were performed similarly. The results are summarized in Table 3.

Example 16

Pelletization was carried out in a similar manner to Example 11 except that phosphorus-containing flame-retardant #4 was substituted with phosphorus-containing flame-retardant #2. Molding and evaluation were performed similarly. The results are summarized in Table 3.

Example 17

Pelletization was carried out in a similar manner to Example 12 except that sulfonic acid metal salt #1 was substituted with sulfonic acid metal salt #2. Molding and evaluation were performed similarly. The results are summarized in Table 3.

Comparative Example 1

Pelletization was carried out in a similar manner to Example 11 except that multi-layered polymer #3 was substituted with multi-layered polymer #5. Molding and evaluation were performed similarly. The results are summarized in Table 4.

Comparative Example 2

Pelletization was carried out in a similar manner to Example 11 except that multi-layered polymer #3 was substituted with multi-layered polymer #6. Molding and evaluation were performed similarly. The results are summarized in Table 4.

Comparative Example 3

Pelletization was carried out in a similar manner to Example 12 except that sulfonic acid metal salt #1 was not used. Molding and evaluation were performed similarly. The results are summarized in Table 4.

Comparative Example 4

Pelletization was carried out in a similar manner to Example 11 except that PTFE was not used. Molding and evaluation were performed similarly. The results are summarized in Table 4.

Example 18

100 parts by weight of PC resin, 6.8 parts by weight of phosphorus-containing flame retardant #3, 5.6 parts by weight of multi-layered polymer #2, and 0.23 parts by weight of PTFE were mixed at a tumbler for 20 min. The resultant mixture was pelletized using a 30 mm twine screw extruder at a cylinder temperature of 270° C. The obtained pellets were molded to specimens having a thickness of 1.6 mm for burning test using an injection molding machine, to evaluate flammability according to the UL method for testing. In addition, specimen for the Izod impact test were molded at a cylinder temperature of 270° C. normally or after staying in the molding machine for 30 min, followed by cutting a notch having 0.25R using a notching machine to evaluate with an Izod impact-testing machine. In addition, a battery-packing case having a dimension of 40 mm×50 mm and a thickness of 0.8 mm was molded at a cylinder temperature of 320° C., followed by visual observation of appearance of a molded product. The results of evaluation were as follows:

| | |
|---|---|
| Flammability (1.6 mm) | V-O |
| Izod impact strength (j/m) | 755 |
| Stay molding: | |
| Appearance | Good (no pearl gloss, no silver streak) |
| Izod impact strength (j/m) | 686 |
| Battery-packing molded product: | |
| Appearance | Good (no pearl gloss, no silver streak) |

TABLE 1

| | Example 1 | Example 2 | Example 3 | Example 4 |
|---|---|---|---|---|
| PC (parts by weight) | 100 | 100 | 100 | 100 |
| Phosphorus-containing flame retardant #1 (parts by weight) | 11.8 | | | |
| Phosphorus-containing flame retardant #3 (parts by weight) | | 11.8 | | |
| Phosphorus-containing flame retardant #4 (parts by weight) | | | 11.8 | |
| Phosphorus-containing flame retardant #5 (parts by weight) | | | | 11.8 |
| Multi-layered polymer #1 (parts by weight) | 5.9 | 5.9 | 5.9 | 5.9 |
| PTFE (parts by weight) | 0.35 | 0.35 | 0.35 | 0.35 |
| UV-light absorbent (parts by weight) | 0.35 | 0.35 | 0.35 | 0.35 |
| Deflection temperature under load (° C.) | 102 | 95 | 102 | 102 |
| Izod impact strength (j/m) | 764 | 559 | 706 | 588 |
| YI Early stage | 1.82 | 1.56 | 1.82 | 1.52 |
| After weather-resistance test | 14.85 | 22.34 | 34.65 | 20.65 |
| Mold-depositing property | ○ | ○ | ○ | ○ |
| Flammability 0.8 mm | V-0 | V-0 | V-0 | V-0 |

TABLE 2

| | Example 5 | Example 6 | Example 7 | Example 8 | Example 9 | Example 10 |
|---|---|---|---|---|---|---|
| PC (parts by weight) | 100 | 100 | 100 | 100 | 100 | 100 |
| Phosphorus-containing flame retardant #1 (parts by weight) | 11.8 | 11.8 | | | | |
| Phosphorus-containing flame retardant #2 (parts by weight) | | | 11.8 | | | |
| Phosphorus-containing flame retardant #3 (parts by weight) | | | | 11.8 | | |
| Phosphorus-containing flame retardant #4 (parts by weight) | | | | | 11.8 | |
| Phosphorus-containing flame retardant #5 (parts by weight) | | | | | | 11.8 |
| Multi-layered polymer #1 (parts by weight) | 5.9 | | 5.9 | 5.9 | 5.9 | 5.9 |
| Multi-layered polymer #2 (parts by weight) | | 5.9 | | | | |
| PTFE (parts by weight) | 0.35 | 0.35 | 0.35 | 0.35 | 0.35 | 0.35 |
| UV-light absorbent (parts by weight) | 0.35 | 0.35 | 0.35 | 0.35 | 0.35 | 0.35 |
| Titanium oxide (parts by weight) | 16.2 | 16.2 | 16.2 | 16.2 | 16.2 | 16.2 |
| Deflection temperature under load (° C.) | 102 | 102 | 90 | 95 | 102 | 102 |
| Izod impact strength (j/m) | 568 | 588 | 490 | 441 | 519 | 470 |
| YI: Early stage | 1.54 | 1.54 | 0.70 | 1.01 | 1.35 | 1.80 |
| After evaluation of weather-resistance test | 12.04 | 13.50 | 12.23 | 16.54 | 26.84 | 17.00 |
| Reflection coefficient: Early stage (%) | 95 | 95 | 95 | 95 | 95 | 95 |
| After evaluation of weather-resistance test (%) | 93 | 92 | 93 | 90 | 85 | 90 |
| Mold-depositing property | ○ | ○ | X | ○ | ○ | ○ |
| Flammability 0.8 mm | V-0 | V-0 | V-0 | V-0 | V-0 | V-0 |

TABLE 3

|  | Example 11 | Example 12 | Example 13 | Example 14 | Example 15 | Example 16 | Example 17 |
|---|---|---|---|---|---|---|---|
| PC (parts by weight) | 100 | 100 | 100 | 100 | 100 | 100 | 100 |
| Phosphorus-containing flame retardant #4 (parts by weight) | 2.1 | 6.8 | 18.8 | 2.1 |  |  | 6.8 |
| Phosphorus-containing flame retardant #3 (parts by weight) |  |  |  |  | 2.1 |  |  |
| Phosphorus-containing flame retardant #2 (parts by weight) |  |  |  |  |  | 2.1 |  |
| Multi-layered polymer #3 (parts by weight) | 3.2 | 5.6 | 6.3 |  | 3.2 | 3.2 | 5.6 |
| Multi-layered polymer #4 (parts by weight) |  |  |  | 3.2 |  |  |  |
| PTFE (parts by weight) | 0.21 | 0.23 | 0.25 | 0.21 | 0.21 | 0.21 | 0.23 |
| Sulfonic acid metal salt #1 (parts by weight) | 0.11 | 0.11 | 0.12 | 0.11 | 0.11 | 0.11 |  |
| Sulfonic acid metal salt #2 (parts by weight) |  |  |  |  |  |  | 0.11 |
| Izod impact strength (j/m) | 676 | 725 | 686 | 686 | 637 | 666 | 715 |
| Flammability (1.6 mm): |  |  |  |  |  |  |  |
| Longest after flame time (sec) | 5 | 2 | 1 | 3 | 2 | 2 | 2 |
| Total after flame time (sec) | 14 | 11 | 10 | 17 | 11 | 11 | 11 |
| Evaluation | V-0 | V-0 | V-0 | V-0 | V-0 | V-0 | V-0 |

TABLE 4

|  | Comparative Example 1 | Comparative Example 2 | Comparative Example 3 | Comparative Example 4 |
|---|---|---|---|---|
| PC (parts by weight) | 100 | 100 | 100 | 100 |
| Phosphorus-containing flame retardant #4 (parts by weight) | 2.1 | 2.1 | 2.1 | 2.1 |
| PTFE (parts by weight) | 0.21 | 0.21 | 0.21 |  |
| Sulfonic acid metal salt #1 (parts by weight) | 0.11 | 0.11 |  | 0.11 |
| Multi-layered polymer #3 (parts by weight) |  |  | 3.2 | 3.2 |
| Multi-layered polymer #5 (parts by weight) | 3.2 |  |  |  |
| Multi-layered polymer #6 (parts by weight) |  | 3.2 |  |  |
| Izod impact strength (j/m) | 294 | 137 | 637 | 588 |
| Flammability (1.6 mm): |  |  |  |  |
| Longest after flame time (sec) | 12 | 11 | 17 | 15 |
| Total after flame time (sec) | 43 | 36 | 48 | 47 |
| Evaluation | V-1 | V-1 | V-1 | V-2 |

Multi-layered polymers #5 and #6 are outside the scope of the present invention because the outer layers do not have an adhesiveness or miscibility to polycarbonate.

The flame-retardant polycarbonate resin composition according to the present invention has an excellent impact strength, a high flammability eat resistance, and an excellent weather-resistance, and does not cause corrosion of a metal mold, a screw or other metal parts when molding. The composition also does not give mold-depositing, and has an excellent moldability. Therefore, the flame-retardant polycarbonate resin composition according to the present invention can be used in electric/electronic field, automobile field, and general industrial fields, as well as fields in which a weather-resistance is required. The flame-retardant polycarbonate resin composition according to the present invention does not require any secondary processing such as coating to supplement a weather-resistance, so that painting can be omitted. Therefore, the flame-retardant polycarbonate resin composition according to the present invention has a wide industrial value.

What is claimed is:

1. A flame-retardant polycarbonate resin composition which comprises (a) 100 parts by weight of an aromatic polycarbonate resin, (b) 0.5–40 parts by weight of a phosphorus-containing flame retardant represented by formula III below:

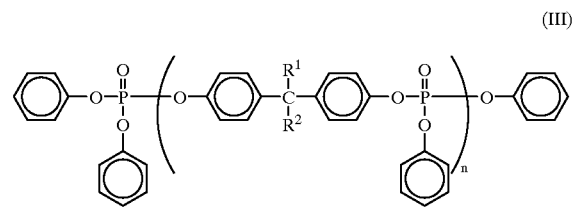

(III)

wherein $R^1$ and $R^2$ are each independently a methyl group, a hydrogen atom or a phenyl group; and n is an integer from 1 to 5, (c) 0.01–5 parts by weight of polyfluoroethylene, (d) 0–5 parts by weight of sulfonic acid metal salt, and (e) 0.5–30 parts by weight of a multi-layered polymer having a core layer made of an elastic polymer having a glass-transition temperature (Tg) lower than a room temperature, and an outer layer made of alkyl(meth)acrylate polymer, provided that the composition comprises 3–40 parts by weight of a phosphorus-containing flame retardant when said composition comprises substantially no sulfonic acid metal salt.

2. The flame-retardant polycarbonate resin composition according to claim 1, wherein said composition comprises 3–40 parts by weight of a phosphorus-containing flame retardant (b), and comprises substantially no sulfonic acid metal salt (d).

3. The flame-retardant polycarbonate resin composition according to claim 1, wherein said composition further comprises (f) 2 parts by weight or less of a UV-light absorber.

4. The flame-retardant polycarbonate resin composition according to claim 1, wherein said composition further comprises (g) 0.1–20 parts by weight or less of a surface-treated titanium oxide.

5. The flame-retardant polycarbonate resin composition according to claim 1, wherein the aromatic polycarbonate resin (a) is derived from 2,2-bis(4-hydroxyphenyl)propane.

6. The flame-retardant polycarbonate resin composition according to claim 1, wherein the aromatic polycarbonate resin wherein $R^1$ and $R^2$ are each independently methyl group, hydrogen atom or phenyl group; n is an integer from 1 to 5.

7. The flame-retardant polycarbonate resin composition according to claim 1, wherein polyfluoroethylene (c) has a fibril-forming ability.

8. The flame-retardant polycarbonate resin composition according to claim 1, wherein the multi-layered polymer (e) has a core layer made of an elastic polymer consisting of alkyl(meth)acrylate polymer.

9. The flame-retardant polycarbonate resin composition according to claim 1, wherein the multi-layered polymer (e) has a core layer made of an elastic polymer consisting of crosslinked alkyl(meth)acrylate polymer having a glass-transition temperature of 0° C. or lower, and an outer layer made of alkyl (meth)acrylate polymer.

10. The flame-retardant polycarbonate resin composition according to claim 1, wherein the multi-layered polymer (e) has a core layer made of a diene-containing polymer.

11. The flame-retardant polycarbonate resin composition according to claim 1, wherein the multi-layered polymer (e) has a core layer made of a polybutadiene or a butadiene/styrene copolymer.

12. The flame-retardant polycarbonate resin composition according to claim 1, wherein the multi-layered polymer (e) has a core layer made of a crosslinked butadiene-containing copolymer.

13. A molded product made of a flame-retardant polycarbonate resin composition which comprises (a) 100 parts by weight of an aromatic polycarbonate resin, (b) 0.5–40 parts by weight of a phosphorus-containing flame retardant represented by formula III below:

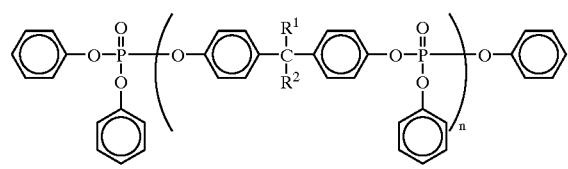

wherein $R^1$ and $R^2$ are each independently a methyl group, a hydrogen atom or a phenyl group; and n is an integer from 1 to 5, (c) 0.01–5 parts by weight of polyfluoroethylene, (d) 0–5 parts by weight of sulfonic acid metal salt, and (e) 0.5–30 parts by weight of a multi-layered polymer having a core layer made of an elastic polymer having a glass-transition temperature (Tg) lower than a room temperature, and an outer layer made of alkyl(meth)acrylate polymer, provided that the composition comprises 3–40 parts by weight of a phosphorus-containing flame retardant when said composition comprises substantially no sulfonic acid metal salt.

* * * * *

UNITED STATES PATENT AND TRADEMARK OFFICE
CERTIFICATE OF CORRECTION

PATENT NO. : 6,369,141 B1
DATED : April 9, 2002
INVENTOR(S) : Kazuhiko Ishii, Ken Shimomai and Michio Nakata It is certified that error appears in the above-identified patent and that said Letters Patent is hereby corrected as shown below:

Column 20,
Line 62, replace "wherein $R^1$ and $R^2$ are each independently methyl" with
-- (a) has a viscosity-average molecular weight of 16,000-30,000 --;
Line 63, delete "group, hydrogen atom or phenyl group; n is an integer from"
Line 64, delete "1 to 5".

Signed and Sealed this

Twenty-fourth Day of December, 2002

JAMES E. ROGAN
*Director of the United States Patent and Trademark Office*